US012597559B2

(12) United States Patent　　　(10) Patent No.: US 12,597,559 B2
Kim et al.　　　　　　　　　　　(45) Date of Patent: Apr. 7, 2026

(54) MULTILAYER CERAMIC CAPACITOR AND METHOD OF PREPARING THE SAME

(71) Applicant: SAMSUNG ELECTRO-MECHANICS CO., LTD., Suwon-si (KR)

(72) Inventors: Nayoung Kim, Suwon-si (KR); Hyunjun Hwang, Suwon-si (KR); Changsoo Jang, Suwon-si (KR); Munseong Jeong, Suwon-si (KR); Won Seok Jang, Suwon-si (KR); Jungmin Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 90 days.

(21) Appl. No.: 18/584,652

(22) Filed: Feb. 22, 2024

(65) Prior Publication Data

US 2025/0104914 A1　　Mar. 27, 2025

(30) Foreign Application Priority Data

Sep. 27, 2023　(KR) ........................ 10-2023-0130488

(51) Int. Cl.
　*H01G 4/008*　　(2006.01)
　*H01G 4/12*　　(2006.01)
　*H01G 4/30*　　(2006.01)
(52) U.S. Cl.
　CPC ......... *H01G 4/0085* (2013.01); *H01G 4/1227* (2013.01); *H01G 4/30* (2013.01)
(58) Field of Classification Search
　CPC ...... H01G 4/008; H01G 4/1227; H01G 4/012; H01G 4/30; H01G 4/0085
　See application file for complete search history.

(56) References Cited

U.S. PATENT DOCUMENTS

2004/0256603 A1　12/2004　Celik et al.
2013/0321978 A1　12/2013　Lee et al.
　　　　　　　(Continued)

FOREIGN PATENT DOCUMENTS

JP　　2003231902 A　*　8/2003
KR　　20100000730 A　*　1/2010　............... H01B 1/22
　　　　　　　(Continued)

OTHER PUBLICATIONS

Alexander van Teijlingen et al., "Size-dependent melting point depression of nickel nanoparticles," Nanoscale Advances, vol. 2, 2020, pp. 2347-2351.
　　　　　　　(Continued)

*Primary Examiner* — David M Sinclair
(74) *Attorney, Agent, or Firm* — Morgan, Lewis & Bockius LLP

(57) ABSTRACT

A multilayer ceramic capacitor includes: a capacitor body that includes a dielectric layer and an internal electrode layer; and an external electrode that is disposed outside the capacitor body. The internal electrode layer includes nickel (Ni) and cerium (Ce), and along a thickness direction of the internal electrode layer, the internal electrode layer comprises an upper portion, a middle portion, and a lower portion, the middle portion is referred to as a central region, and at least one of the upper portion and the lower portion having an interface between the internal electrode layer and the dielectric layer is referred to as an interface region, both the central region and the interface region of the internal electrode layer include the cerium (Ce), and the interface region includes the cerium (Ce) in a content higher than a content of cerium (Ce) in the central region.

20 Claims, 13 Drawing Sheets

(56) References Cited

U.S. PATENT DOCUMENTS

2021/0057156 A1    2/2021  Seo et al.
2021/0366653 A1*  11/2021  Oh ...................... H01G 4/0085

FOREIGN PATENT DOCUMENTS

KR        10-0950127  B1    3/2010
KR        10-1548787  B1    8/2015
KR     10-2019-0116153  A   10/2019

OTHER PUBLICATIONS

Anton V. Polotai et al., "Effect of Cr Additions on the Microstructural Stability of Ni Electrodes in Ultra-Thin Ni—BaTiO3 Multilayer Capacitors," Journal of Electroceramics, vol. 18, 2007, pp. 261-268.
Yang Gong-An et al., "Effect of CeO2 Addition on the Microstructure and Dielectric Properties of BaTiO3 Co-Doped with Nb and Fe, Ferroelectrics," vol. 407, 2010, pp. 31-38.

* cited by examiner

FIG. 7

MULTILAYER CERAMIC CAPACITOR AND METHOD OF PREPARING THE SAME

CROSS-REFERENCE TO RELATED APPLICATION

This application claims priority to and the benefit of Korean Patent Application No. 10-2023-0130488 filed at the Korean Intellectual Property Office on Sep. 27, 2023, the entire contents of which are incorporated herein by reference.

BACKGROUND

(a) Technical Field

The present disclosure relates to a multilayer ceramic capacitor and a method of manufacturing the same.

(b) Description of the Related Art

An electronic component that uses a ceramic material includes a capacitor, an inductor, a piezoelectric element, a varistor, a thermistor, or the like. A multilayer ceramic capacitor (MLCC) among the ceramic electronic component may be used in various electronic devices due to its advantages of being small, high-capacity, and easy to mount.

For example, the multilayer ceramic capacitor may be mounted on substrates of various electronic products such as an imaging device such as a liquid crystal display device (LCD), a plasma display device panel (PDP), an organic light emitting diode (OLED), or the like, a computer, a personal portable terminal, and a smartphone so that the multilayer ceramic capacitor is used as a chip-type condenser that plays a role in charging or discharging electricity therein or therefrom.

Recently, high performance and miniaturization of the multilayer ceramic capacitor have been greatly required. In order to implement a high-capacity and small-sized multilayer ceramic capacitor, a dielectric layer and an internal electrode layer have to be thin. As the dielectric layer and the internal electrode layer become thinner, a reliability problem such as short circuit occurrence, degradation of a DC, degradation of a break down voltage (BDV), or the like, occurs. On the other hand, in the case of the multilayer ceramic capacitor used in an autonomous vehicle or an electric vehicle, not only thinness but also high reliability is required.

SUMMARY

An embodiment provides a multilayer ceramic capacitor in which internal electrode connectivity is improved due to a reduction in sintering mismatch between a dielectric layer and an internal electrode layer and reliability such as a breakdown voltage (BDV) or the like is improved.

Another embodiment provides a method of manufacturing the multilayer ceramic capacitor.

A multilayer ceramic capacitor according to an embodiment includes: a capacitor body that includes a dielectric layer and an internal electrode layer; and an external electrode that is disposed outside the capacitor body. The internal electrode layer includes nickel (Ni) and cerium (Ce), and along a thickness direction of the internal electrode layer, the internal electrode layer includes an upper portion, a middle portion, and a lower portion, the middle portion is referred to as a central region, and at least one of the upper portion and the lower portion having an interface between the internal electrode layer and the dielectric layer is referred to as an interface region, both the central region and the interface region of the internal electrode layer include the cerium (Ce), and the interface region includes the cerium (Ce) in a content higher than a content of cerium (Ce) in the central region.

The interface region of the internal electrode layer may include the cerium (Ce) in a content that is 1.5 to 3 times higher than the content of cerium (Ce) in the central region of the internal electrode layer.

The internal electrode layer may include cerium (Ce) in an amount of 0.01 parts by weight to 5 parts by weight based on 100 parts by weight of the nickel (Ni).

The internal electrode layer may further include copper (Cu), silver (Ag), palladium (Pd), gold (Au), an alloy thereof, or a combination thereof.

The dielectric layer may include a barium titanate-based main ingredient including barium (Ba) and titanium (Ti), and cerium (Ce).

Along a thickness direction of the dielectric layer, the dielectric layer may include an upper portion, a middle portion, and a lower portion, the middle portion is referred to as a central region, and at least one of the upper portion and the lower portion having an interface between the dielectric layer and the internal electrode layer is referred to as an interface region, the interface region of the dielectric layer may include the cerium (Ce).

The interface region of the dielectric layer may include the cerium (Ce) in an amount of 0.05 parts by mole to 1 parts by mole based on 100 parts by mole of the barium (Ba) within the interface region of the dielectric layer.

The interface region of the dielectric layer may include a region from the interface between the dielectric layer and the internal electrode layer to a depth of 10 nm to 100 nm, and the region may include the cerium (Ce) in an amount of 0.05 parts by mole to 1 parts by mole based on 100 parts by mole of the barium (Ba).

The interface region of the dielectric layer may include a plurality of dielectric grains, at least one of the plurality of dielectric grains may have a structure including a core and a shell surrounding at least a portion of the core, and the shell may include the cerium (Ce).

A size D50 of the plurality of dielectric grains may be 50 nm to 250 nm.

The cerium (Ce) included in the dielectric layer may be derived from cerium oxide ($CeO_2$) used in forming the internal electrode layer and may be an ingredient diffusing into the dielectric layer after sintering.

A method of manufacturing the multilayer ceramic capacitor according to an embodiment includes: preparing a conductive paste by mixing a raw material including nickel (Ni) and cerium oxide ($CeO_2$); manufacturing a dielectric green sheet using a dielectric slurry and printing the conductive paste on a surface of the dielectric green sheet to form a conductive paste layer; manufacturing a dielectric green sheet stacking body by stacking the dielectric green sheet on which the conductive paste layer is formed; manufacturing a capacitor body including a dielectric layer and an internal electrode layer by sintering the dielectric green sheet stacking body; and forming an external electrode on one surface of the capacitor body. The internal electrode layer includes nickel (Ni) and cerium (Ce), and along a thickness direction of the internal electrode layer, the internal electrode layer includes an upper portion, a middle portion, and a lower portion, the middle portion is referred to as a central region, and at least one of the upper portion and the lower portion having an interface between the internal electrode layer and the dielectric layer is referred to as an interface region, both the central region and the interface region of the internal electrode layer include the cerium (Ce), and the interface region includes the cerium (Ce) in a content higher than a content of cerium (Ce) in the central region.

The cerium oxide ($CeO_2$) may be mixed in an amount of 0.01 parts by weight to 5 parts by weight based on 100 parts by weight of the nickel (Ni).

The raw material may further include copper (Cu), silver (Ag), palladium (Pd), gold (Au), an alloy thereof, or a combination thereof.

The dielectric slurry may be prepared by mixing a barium titanate-based main ingredient powder and an accessory ingredient powder.

The sintering may be performed at a temperature of 1000° C. to 1400° C.

The sintering may be performed in a reducing atmosphere.

The sintering may be performed in an atmosphere having an oxygen partial pressure of $1.0\times10^{-14}$ MPa to $1.0\times10^{-10}$ MPa.

The dielectric layer may include cerium (Ce) that may be obtained from cerium oxide ($CeO_2$) used in forming the internal electrode layer and that may diffuse into the dielectric layer after the sintering.

The accessory ingredient powder may include manganese (Mn), chromium (Cr), silicon (Si), aluminum (AI), magnesium (Mg), tin (Sn), antimony (Sb), germanium (Ge), gallium (Ga), indium (In), barium (Ba), lanthanum (La), yttrium (Y), actinium (Ac), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or a combination thereof.

According to the multilayer ceramic capacitor of the embodiment, sintering mismatch between a dielectric layer and an internal electrode layer is reduced so that internal electrode connectivity is improved, and reliability such as a breakdown voltage (BDV) or the like is improved.

BRIEF DESCRIPTION OF THE DRAWINGS

FIG. 7 is a thermomechanical analysis (TMA) graph of an internal electrode layer material according to Example 6 and Comparative Example 1.

4

DETAILED DESCRIPTION OF THE EMBODIMENTS

Figure 1:
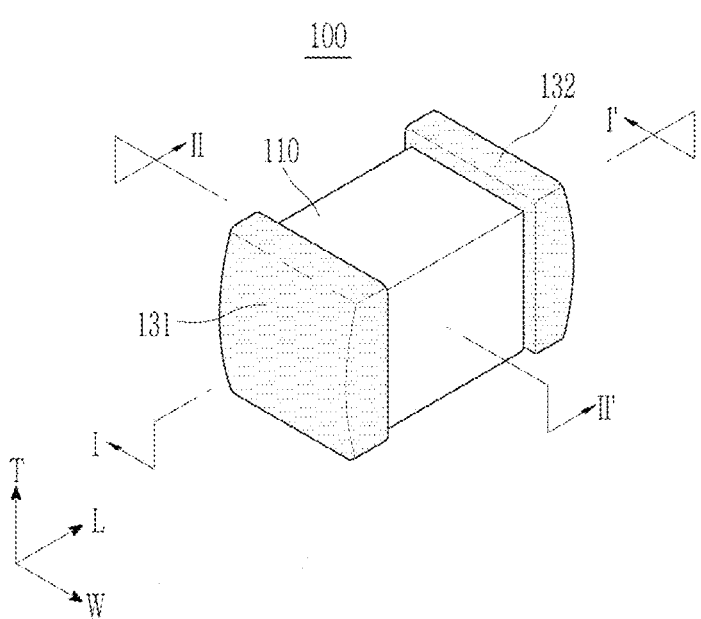
FIG. 1 is a perspective view showing a multilayer ceramic capacitor according to an embodiment.

The present disclosure will be described more fully hereinafter with reference to the accompanying drawings, in which embodiments of the disclosure are shown. In order to clearly describe the present disclosure, parts or portions that are irrelevant to the description are omitted, and identical or similar constituent elements throughout the specification are denoted by the same reference numerals. Additionally, in the accompanying drawings, some constituent elements are exaggerated, omitted, or schematically shown, and a size of each constituent element does not entirely reflect an actual size.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including an ordinal number such as first, second, and the like may be used to describe various constituent elements, but the constituent elements are not limited by the terms. The terms are used only for the purpose of distinguishing one constituent element from another.

It will be understood that when an element such as a layer, film, region, area, or substrate is referred to as being "on" or "above" another element, it may be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In the present application, terms such as "comprise" or "have" are intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof. In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by perpendicularly cutting a target portion from the side.

Throughout the specification, when it is described that a part is "connected" to another part, the part may be "directly connected" to the other element, may be "connected" to the other part through a third part, or may be connected to the other part physically or electrically, and may be referred to by different titles depending on positions or functions, but respective portions that are substantially integrated into one body may be connected to each other.

Hereinafter, a multilayer ceramic capacitor according to an embodiment will be described with reference to FIGS. 1 to 4.

Figure 2:
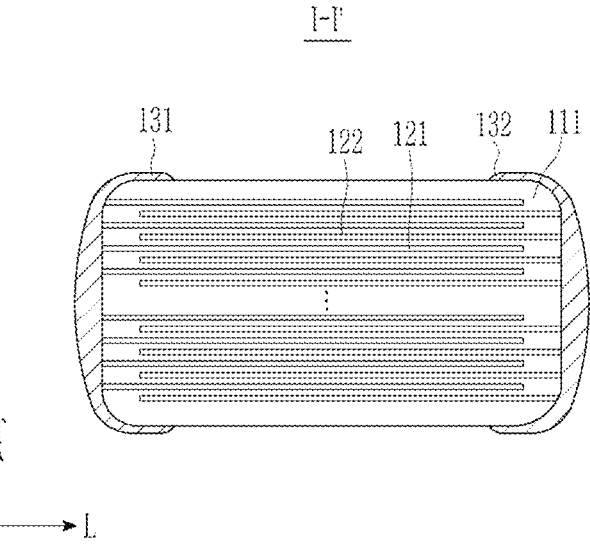
FIG. 2 is a cross-sectional view of the multilayer ceramic capacitor cut along a line I-I' in FIG. 1.
Figure 3:
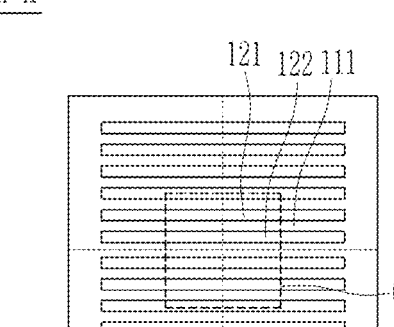
FIG. 3 is a cross-sectional view of the multilayer ceramic capacitor cut along a line II-II' in FIG. 1.
Figure 3:
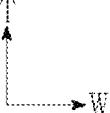
Figure 4:
FIG. 4 is a schematic diagram showing a portion of an active region of FIG. 3.

FIG. 1 is a perspective view showing the multilayer ceramic capacitor according to the embodiment, FIG. 2 is a cross-sectional view of the multilayer ceramic capacitor cut along a line I-I' of FIG. 1, FIG. 3 is a cross-sectional view of the multilayer ceramic capacitor cut along a line II-II' of FIG. 1, and FIG. 4 is a schematic diagram showing a portion of an active region of FIG. 3.

An L-axis, a W-axis, and a T-axis shown in FIGS. 1 to 4 represent a length direction, a width direction, and a thickness direction of a capacitor body 110, respectively. Here, the thickness direction (a T-axis direction) may be a direction perpendicular to a wide surface (a main surface) of a constituent element having a sheet shape. For example, the thickness direction (the T-axis direction) may be used as the same concept as a stacking direction in which dielectric layers 111 is stacked. The length direction (an L-axis direction) may be a direction that extends parallel to the wide surface (the main surface) of the constituent element having the sheet shape, and may be a direction approximately perpendicular to the thickness direction (the T-axis direction). For example, the length direction (the L-axis direction) may be a direction in which a first external electrode 131 and a second external electrode 132 are disposed at both surfaces. The width direction (a W-axis direction) is a direction that extends parallel to the wide surface (the main surface) of the constituent element having the sheet shape, and may be a direction approximately perpendicular to the thickness direction (the T-axis direction) and the length direction (the L-axis direction), and a length of the constituent element having the sheet shape in the length direction (the L-axis direction) may be greater than a length of the constituent element having the sheet shape in the width direction (the W-axis direction).

Referring to FIGS. 1 to 4, the multilayer ceramic capacitor 100 according to the embodiment includes the capacitor body 110, and the external electrodes 131 and 132 disposed outside the capacitor body 110. The external electrodes 131 and 132 may include the first external electrode 131 and the second external electrode 132 disposed at both ends of the capacitor body 110 facing each other in the length direction (the L-axis direction).

For example, the capacitor body 110 may have an approximate hexahedral shape.

For convenience of description of the embodiment, both surfaces of the capacitor body 110 facing each other in the thickness direction (the T-axis direction) are defined as a first surface and a second surface, both surfaces connected to the first surface and the second surface and facing each other in the length direction (the L-axis direction) are defined as a third surface and a fourth surface, and both surfaces connected to the first and second surfaces and the third and fourth surfaces and facing each other in the width direction (the W-axis direction) are defined as a fifth surface and a sixth surface.

For example, the first surface that is a lower surface may be a surface facing a mounting direction. Additionally, the first to sixth surfaces may be flat, but the present disclosure is not limited thereto. For example, each of the first to sixth surfaces may be a curved surface having a convex central portion, and a corner that is a boundary of the surfaces may be rounded.

A shape and a dimension of the capacitor body 110 and the number of the stacked dielectric layers 111 are not limited to those shown in the drawings of the present disclosure.

The capacitor body 110 includes a plurality of dielectric layers 111 and internal electrode layers 121 and 122. Specifically, the capacitor body 110 includes the plurality of dielectric layers 111 and the first internal electrode layer 121 and the second internal electrode layer 122 alternately disposed in the thickness direction (the T-axis direction) with the dielectric layer 111 interposed therebetween.

In this case, a boundary between the dielectric layers 111 of the capacitor body 110 adjacent to each other may be integrated to an extent that it is difficult to check the boundary without using a scanning electron microscope (SEM).

Referring to FIG. 3, the capacitor body 110 may include the active region.

The active region is a portion that contributes to forming capacitance of the multilayer ceramic capacitor 100. For example, the active region may be a region where the first internal electrode layer 121 or the second internal electrode layer 122 stacked along the thickness direction (the T-axis direction) overlaps.

Additionally, the capacitor body 110 may further include a cover region and a side margin region.

The cover region may be a margin portion in the thickness direction, and may be disposed on the first surface and the second surface of the active region in the thickness direction (the T-axis direction), respectively. The cover region may be a single dielectric layer 111 or two or more dielectric layers 111 stacked on upper and lower surfaces of the active region, respectively.

The side margin region may be a margin portion in the width direction, and may be disposed on the fifth surface and the sixth surface of the active region in the width direction (the W-axis direction), respectively. The side margin region may be formed by stacking dielectric green sheets in which a conductive paste layer is applied only on some regions of the surface of the dielectric green sheet and no conductive paste layer is applied on both side surfaces of a surface of the dielectric green sheet when the conductive paste layer for the internal electrode is applied on the surface of the dielectric green sheet and then firing the stacked dielectric green sheets.

The cover region and the side margin region serve to prevent damage to the first internal electrode layer 121 and the second internal electrode layer 122 due to physical or chemical stress.

The first internal electrode layer 121 and the second internal electrode layer 122 may be electrodes with different polarities, the first internal electrode layer 121 and the second internal electrode layer 122 may be alternately disposed to face each other along the T-axis direction with the dielectric layer 111 interposed therebetween, and one end of each of the first internal electrode layer 121 and the second internal electrode layer 122 may be exposed through each of the third surface and the fourth surface of the capacitor body 110.

The first internal electrode layer 121 and the second internal electrode layer 122 may be electrically insulated from each other by the dielectric layer 111 disposed in the middle thereof.

End portions of the first internal electrode layer 121 and the second internal electrode layer 122 that are alternately exposed through the third and fourth surfaces of the capacitor body 110 may be electrically connected to the first external electrode 131 and the second external electrode 132, respectively.

The internal electrode layers 121 and 122, that is, the first internal electrode layer 121 and the second internal electrode layer 122 according to an embodiment include nickel (Ni) and cerium (Ce).

In order to implement a thin internal electrode layer, atomization of a material of the internal electrode layer may be implemented. If the material of the internal electrode layer is atomized to become a level of a nanoparticle, a melting point thereof tends to decrease as a size of the particle becomes smaller. A phenomenon of lowering the melting point leads to a decrease in a temperature at which heat shrinkage begins, and a degree to which a melting point is lowered of a metal is much greater than that of a ceramic material. Thus, during a firing process of the multilayer ceramic capacitor, sintering mismatch between the internal electrode layer and the dielectric layer is further increased. For example, at a time when the sintering mismatch is maximized, there may be a difference of 500° C. or more between a sintering time of the dielectric layer and a sintering time of the internal electrode layer. As the internal electrode layer begins to sinter before the dielectric layer, nearby particles agglomerate, balling occurs, breakage occurs first in a thinly printed portion, and connectivity deteriorates. To solve the problem, a method of adding a co-material to the internal electrode layer is used. However, if an added amount of the co-material increases, a film density of the internal electrode layer may decrease, and the co-material may be squeezed-out toward the dielectric layer so that a side effect of thickening the dielectric layer occurs.

According to the embodiment, cerium (Ce) that has better thermal stability and a higher melting point than barium titanate ($BaTiO_3$) used as the co-material, may be applied to the internal electrode layers 121 and 122 to solve deterioration of connectivity of the internal electrode due to the sintering mismatch. For reference, a melting point of nickel oxide (NiO) is 1,455° C., a melting point of barium titanate ($BaTiO_3$) is 1,625° C., and a melting point of cerium oxide ($CeO_2$) is 2,400° C. Cerium oxide ($CeO_2$) is a non-reducing material and has a large sintering delay effect.

In other words, the internal electrode layers 121 and 122 according to the embodiment may include cerium (Ce) to increase thermal stability of the internal electrode layer during high-temperature firing. Thus, the sintering mismatch between the dielectric layer and the internal electrode layer may be reduced so that the connectivity of the internal electrode is improved. Additionally, cerium (Ce) may diffuse into the dielectric layer 111 during the firing so that degradation due to oxygen vacancy is improved. Thus, reliability such as a breakdown voltage (BDV) or the like may be improved.

Specifically, cerium (Ce) may be included within each of the internal electrode layers 121 and 122 in an amount of 0.01 parts by weight to 5 parts by weight based on 100 parts by weight of nickel (Ni). For example, cerium (Ce) may be included within each of the internal electrode layers 121 and 122 in an amount of 0.05 parts by weight to 3 parts by weight or in an amount of 0.08 parts by weight to 2.5 parts by weight based on 100 parts by weight of nickel (Ni). When cerium (Ce) is included in the content range within each of the internal electrode layers 121 and 122, the thermal stability of the internal electrode layer may be increased during the high-temperature firing so that the sintering mismatch between the dielectric layer and the internal electrode layer is reduced, and cerium (Ce) may diffuse into the dielectric layer during the firing so that the degradation due to the oxygen vacancy is improved.

The sintering mismatch between the dielectric layer and the internal electrode layer may be reduced so that the connectivity of the internal electrode is improved, and the reliability such as the breakdown voltage (BDV) or the like may be improved.

Cerium (Ce) may be present in both a central region and an interface region of each of the internal electrode layers 121 and 122. Here, the central region and the interface region may be described with reference to FIG. 4. That is, when each of the internal electrode layers 121 and 122 are divided into three portions in the thickness direction to be divided into upper, middle, and lower portions, the middle portion is referred to as the central region A, and at least one of the upper and lower portions having an interface between the dielectric layer 111 and each of the internal electrode layers 121 and 122 is referred to as the interface region B.

Specifically, within each of the internal electrode layers 121 and 122, cerium (Ce) may be included in a higher content in the interface region B than in the central region A. As an example, cerium (Ce) may be included in a content that is 1.5 times to 3 times, 1.7 times to 2.8 times, or 2.0 times to 2.5 times higher in the interface region B than in the central region A. When cerium (Ce) is included in a higher content within the range in the interface region B than in the central region A, the sintering mismatch between the dielectric layer and the internal electrode layer may be reduced so that the connectivity of the internal electrode is improved, and interface reliability and reliability such as the breakdown voltage (BDV) or the like may be improved.

A content of cerium (Ce) within each of the internal electrode layers 121 and 122 and a content ratio of cerium (Ce) in the interface region B with respect to the central region A within each of the internal electrode layers 121 and 122 may be measured by a scanning electron microscope (SEM)-energy dispersion spectroscopy (EDS).

Specifically, a cross-section sample in which a surface in the W-axis and T-axis directions (a WT surface) of the capacitor body 110 is polished to a ½ point in the L-axis direction after the multilayer ceramic capacitor 100 is put into an epoxy mixed liquid (or an epoxy mixture) and the put multilayer ceramic capacitor 100 is cured and the polished capacitor body is maintained within a vacuum atmosphere chamber so that the active region where the dielectric layer 111 and each of the internal electrode layers 121 and 122 cross each other is observed, may be obtained.

Next, the active region, for example, a central portion indicated by C in FIG. 3, of the cross-section sample may be measured using a scanning electron microscope (SEM). For example, the scanning electron microscope may be the Verios G4 product from Thermo fisher Scientific Inc., the measurement condition may be 10 KV and 0.2 nA, an analysis magnification may be 50 k times, and first, third, fifth, or tenth layers of the dielectric layer 111 and the internal electrode layers 121 and 122 may be measured.

Figure 5:
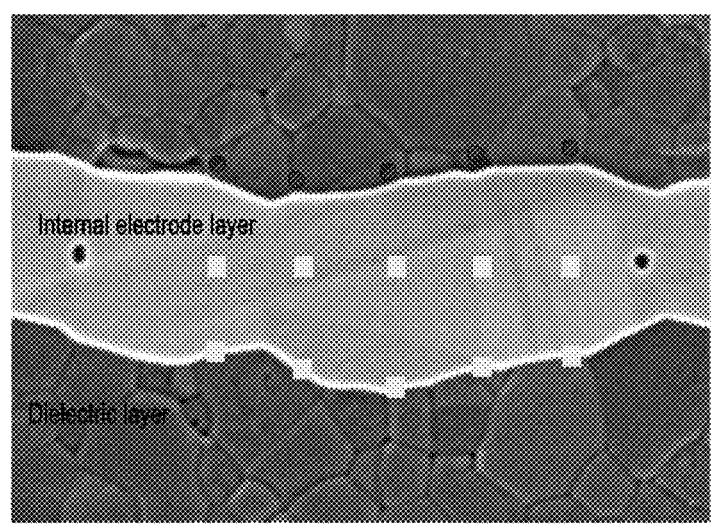
FIG. 5 is a scanning electron microscope (SEM)-energy dispersion spectroscopy (EDS) analysis image of the active region of the multilayer ceramic capacitor.

Subsequently, a content of cerium (Ce) may be analyzed through Point-EDS analysis in the scanning electron microscope (SEM) image of the measured cross-section sample. In the Point-EDS analysis, at least one point, for example, one point, three points, five points, or ten points may be designated at intervals of 100 nm to 1000 nm or at intervals of 300 nm to 700 nm in each of the central region A and the interface region B of each of the internal electrode layers 121 and 122 and an interface region B' of the dielectric layer 111, and a content of cerium (Ce) at each point may be measured. The Point-EDS analysis may obtain an arithmetic average value of the measured values. For example, FIG. 5 is an image showing a position of the SEM-EDS analysis for the active region of the multilayer ceramic capacitor, and as shown in FIG. 5, positions of the Point-EDS analysis may be represented by five points. Other methods and/or tools appreciated by one of ordinary skill in the art, even if not described in the present disclosure, may also be used. The amount of nickel (Ni) and barium (Ba) may be analyzed similarly.

Each of the internal electrode layers 121 and 122 (that is, each of the first internal electrode layer 121 and the second internal electrode layer 122) may further include a conductive metal in addition to nickel (Ni) and cerium (Ce). An example of the conductive metal may be copper (Cu), silver (Ag), palladium (Pd), gold (Au), an alloy thereof, for example, an Ag—Pd alloy, or a combination thereof.

Additionally, each of the internal electrode layers 121 and 122 may include a dielectric particle of the same composition as a ceramic material included in the dielectric layer 111.

Cerium (Ce) included in each of the internal electrode layers 121 and 122 may be an element derived from cerium oxide ($CeO_2$) used to manufacture the internal electrode layers 121 and 122 of the multilayer ceramic capacitor 100. Specifically, each of the internal electrode layers 121 and 122 may be formed using a conductive paste obtained by mixing a raw material including nickel (Ni) and cerium oxide ($CeO_2$). A printing method of the conductive paste may be a screen printing method or a gravure printing method.

An average thickness of each of the first internal electrode layer 121 and the second internal electrode layer 122 may be 0.1 $\mu$m to 2 $\mu$m. In the scanning electron microscope (SEM) image of the cross-section sample measured as described above, a central point of the first internal electrode layer 121 or the second internal electrode layer 122 in the length direction (the L-axis direction) or the width direction (the W-axis direction) may be used as a reference point. The average thickness of each of the first internal electrode layer 121 and the second internal electrode layer 122 may be an arithmetic average value of thicknesses of the first internal electrode layer 121 or the second internal electrode layer 122 at ten points spaced apart from the reference point. An interval of the ten points may be adjusted according to a scale of the scanning electron microscope (SEM) image. For example, the interval of the ten points may be 1 $\mu$m to 100 $\mu$m, 1 $\mu$m to 50 $\mu$m, or 1 $\mu$m to 10 $\mu$m. In this case, all ten points have to be disposed within the first internal electrode layer 121 or the second internal electrode layer 122. If all ten points are not disposed within the first internal electrode layer 121 or the second internal electrode layer 122, a position of the reference point may be changed, or the interval between the ten points may be adjusted.

The dielectric layer 111 according to an embodiment may include a barium titanate-based main ingredient including barium (Ba) and titanium (Ti), and cerium (Ce).

The barium titanate-based main ingredient is a dielectric base material, has a high dielectric constant, and contributes to formation of a dielectric constant of the multilayer ceramic capacitor 100.

For example, the barium titanate-based main ingredient may include $BaTiO_3$, $Ba(Ti,Zr)O_3$, $Ba(Ti,Sn)O_3$, $(Ba,Ca)TiO_3$, $(Ba,Ca)(Ti,Zr)O_3$, $(Ba,Ca)(Ti,Sn)O_3$, $(Ba,Sr)TiO_3$, $(Ba,Sr)(Ti,Zr)O_3$, $(Ba,Sr)(Ti,Sn)O_3$, or a combination thereof.

Cerium (Ce) included in the dielectric layer 111 may be an element derived from cerium oxide ($CeO_2$) used to manufacture the internal electrode layers 121 and 122 of the multilayer ceramic capacitor 100. Specifically, during a sintering process for manufacturing the multilayer ceramic capacitor 100, cerium (Ce) present in the interface region B of each of the internal electrode layers 121 and 122 may partially diffuse into the dielectric layer 111 in contact with the interface region B. Therefore, cerium (Ce) included in the dielectric layer 111 may be caused by diffusion of cerium (Ce) present in the interface region B of each of the internal electrode layers 121 and 122, and the diffusion may improve the degradation due to the oxygen vacancy.

Cerium (Ce) may exist in the interface region of the dielectric layer 111. Here, the interface region may be described with reference to FIG. 4. That is, when the dielectric layer 111 is divided into three portions in the thickness direction to be divided into upper, middle, and lower portions, the middle portion is referred to as a central region A', and at least one of the upper and lower portions having an interface between the dielectric layer 111 and each of the internal electrode layers 121 and 122 is referred to as the interface region B'.

Specifically, cerium (Ce) may be included within the interface region B' of the dielectric layer 111 in an amount of 0.05 parts by mole to 1 parts by mole with respect to 100 parts by mole of barium (Ba). For example, cerium (Ce) may be included within the interface region B' of the dielectric layer 111 in an amount of 0.1 parts by mole to 0.8 parts by mole with respect to 100 parts by mole of barium (Ba). When cerium (Ce) is included in the content range within the interface region B' of the dielectric layer 111, degradation due to oxygen vacancy caused by diffusion of cerium (Ce) within each of the internal electrode layers 121 and 122 (specifically, cerium (Ce) present in the interface region B of each of the internal electrode layers 121 and 122) may be improved. Thus, the reliability such as the breakdown voltage (BDV) or the like may be improved.

For example, among the interface region B' of the dielectric layer 111, in a region B" from the interface between the dielectric layer 111 and each of the internal electrode layers 121 and 122 to a depth of 10 nm to 100 nm or 30 nm to 70 nm, cerium (Ce) may be included in an amount of 0.05 to 1 parts by mole or 0.1 to 0.8 parts by mole with respect to 100 parts by mole of barium (Ba). If cerium (Ce) is included in the content range within the region B" of the dielectric layer 111, the degradation due to the oxygen vacancy caused by diffusion of cerium (Ce) present in the interface region B of each of the internal electrode layers 121 and 122 may be improved. Thus, the reliability such as the breakdown voltage (BDV) or the like may be improved.

A content of cerium (Ce) within the dielectric layer 111 may be measured by the scanning electron microscope (SEM)-energy dispersion spectroscopy (EDS). Specifically, in the scanning electron microscope (SEM) image of the cross-section sample measured as described above, the content of cerium (Ce) may be analyzed through Point-EDS analysis. In the Point-EDS analysis, one point, three points, five points, or ten points may be designated at intervals of 100 nm to 1000 nm or at intervals of 300 nm to 700 nm in the interface region B' of the dielectric layer 111, and a content of cerium (Ce) at each point may be measured. The Point-EDS analysis may obtain an arithmetic average value of the measured values.

The dielectric layer 111 may further include an accessory ingredient. For example, the accessory ingredient may include manganese (Mn), chromium (Cr), silicon (Si), aluminum (Al), magnesium (Mg), tin (Sn), antimony (Sb), germanium (Ge), gallium (Ga), indium (In), barium (Ba), lanthanum (La), yttrium (Y), actinium (Ac), praseodymium (Pr), neodium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or a combination thereof.

The interface region B' of the dielectric layer 111 according to an embodiment may include a plurality of dielectric grains. The dielectric crystal grain may include a barium titanate-based main ingredient and cerium (Ce), and may selectively include an accessory ingredient.

At least one of the plurality of dielectric grains may have a core-shell structure including a core and a shell surrounding at least a portion of the core. Each of the core and the shell may include a barium titanate-based main ingredient and cerium (Ce), and may selectively include an accessory ingredient.

Specifically, according to an embodiment, the shell may include cerium (Ce). Here, cerium (Ce) may be caused by diffusion of cerium (Ce) existing within each of the internal electrode layers 121 and 122 and the cerium (Ce) may act as a donor to a dielectric base material, so that the dielectric constant and the reliability are strengthened by substituting $Ba^{2+}$ of an A-site of the dielectric and forming the shell.

In addition, by including cerium (Ce) in each of the internal electrode layers 121 and 122, a size of the dielectric grain present in the interface region B' of the dielectric layer 111 in contact with each of the internal electrode layers 121 and 122 may be increased. Specifically, a size D50 of the dielectric grain may be 50 nm to 250 nm or 70 nm to 230 nm. If the size D50 of the dielectric I grain is within the range, the dielectric constant and the reliability may be improved. The size D50 of the dielectric grain may be calculated by measuring a maximum long axis of at least 100 dielectric grains in a scanning electron microscope image of the interface region of the dielectric layer in a central portion of the active region of the cross-section sample to create a size distribution cumulative curve. The D50 is a size at 50% of the cumulative curve of size distribution.

An average thickness (an average length in the T-axis direction) of the dielectric layer 111 may be 2.0 μm to 8.0 μm or 2.4 μm to 7.8 μm. If the average thickness of the dielectric layer 111 is within the range, the reliability of the multilayer ceramic capacitor is excellent.

In the scanning electron microscope (SEM) image of the cross-section sample measured as described above, a central point of the dielectric layer 111 in the length direction (the L-axis direction) or the width direction (the W-axis direction) may be used as a reference point. The average thickness of the dielectric layer 111 may be an arithmetic average value of thicknesses of the dielectric layer 111 at ten points spaced apart from the reference point. An interval of the ten points may be adjusted according to a scale of the scanning electron microscope (SEM) image. For example, the interval of the ten points may be 1 μm to 100 μm, 1 μm to 50 μm, or 1 μm to 10 μm. In this case, all ten points have to be disposed within the dielectric layer 111. If all ten points are not disposed within the dielectric layer 111, a position of the reference point may be changed, or the interval between the ten points may be adjusted.

The first external electrode 131 and the second external electrode 132 may be provided with voltages having different polarities, and may be electrically connected to exposed portions of the first internal electrode layer 121 and the second internal electrode layer 122, respectively.

If a predetermined voltage is applied to the first external electrode 131 and the second external electrode 132, a charge is accumulated between the first internal electrode layer 121 and the second internal electrode layer 122 that face each other. In this case, capacitance of the multilayer ceramic capacitor 100 is proportional to overlapped area of the first internal electrode layer 121 and the second internal electrode layer 122 that overlap each other along the T-axis direction in the active region.

Each of the first external electrode 131 and the second external electrode 132 may include first and second connection portions respectively disposed on the third and fourth surfaces of the capacitor body 110 to be connected to the first internal electrode layer 121 and the second internal electrode layer 122, and first and second band portions disposed at corners where the third and fourth surfaces of the capacitor body 110 meet the first and second surfaces or the fifth and sixth surfaces of the capacitor body 110.

The first and second band portions may extend from the first and second connection portions to portions of the first and second surfaces or the fifth and sixth surfaces of the capacitor body 110, respectively. The first and second band portions may serve to improve an adhesion strength of the first external electrode 131 and the second external electrode 132.

Each of the first external electrode 131 and the second external electrode 132 may include a sintering metal layer in contact with the capacitor body 110, a conductive resin layer disposed to cover the sintering metal layer, and a plating layer disposed to cover the conductive resin layer.

The sintering metal layer may include a conductive metal and a glass.

The conductive metal may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, the copper (Cu) may include a copper (Cu) alloy. When the conductive metal includes copper, a metal other than copper may be included in an amount of 5 parts by mole or less with respect to 100 parts by mole of copper.

The glass may include a composition of mixed oxides, and for example, the composition may be one or more selected from the group consisting of silicon oxide, boron oxide, aluminum oxide, transition metal oxide, alkali metal oxide, and alkaline-earth metal oxide. The transition metal may be selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na), and potassium (K), and the alkaline-earth metal may be one or more selected from the group consisting of magnesium (Mg), calcium (Ca), strontium (Sr), and barium (Ba).

Selectively, the conductive resin layer may be formed on the sintering metal layer, and for example, may be formed to completely cover the sintering metal layer. On the other hand, the first external electrode 131 and the second external electrode 132 may not include the sintering metal layer, and in this case, the conductive resin layer may directly contact the capacitor body 110.

The conductive resin layer may extend to the first and second surfaces or the fifth and sixth surfaces of the capacitor body 110, and a length of a region (i.e., the band portion) in which the conductive resin layer extends to the first and second surfaces or the fifth and sixth surfaces of the capacitor body 110 may be greater than a length of a region (i.e., the band portion) in which the sintering metal layer extends to the first and second surfaces or the fifth and sixth surfaces of the capacitor body 110. In other words, the conductive resin layer may be formed on the sintering metal layer, and may be formed to completely cover the sintering metal layer.

The conductive resin layer includes a resin and a conductive metal.

The resin included in the conductive resin layer is not particularly limited as long as it has a bonding property and an impact absorption property and is mixed with a conductive metal powder to make a paste, and for example, may include a phenolic resin, an acrylic resin, a silicone resin, an epoxy resin, or a polyimide resin.

The conductive metal included in the conductive resin layer serves to be electrically connected to the first internal electrode layer 121 and the second internal electrode layer 122 or the sintering metal layer.

The conductive metal included in the conductive resin layer may have a spherical shape, a flake shape, or a combination thereof. In other words, the conductive metal may be made only in the flake shape, may be made only in the spherical shape, or may have a mixture of the flake shape and the spherical shape.

Here, the spherical shape may include a shape that is not a complete spherical shape, and for example, may include a shape in which a length ratio (a long axis/a short axis) of a long axis to a short axis is 1.45 or less. The powder having the flake shape refers to a powder that has a flat and elongated shape, and the flake shape is not particularly limited, but for example, the flake shape may include a shape in which a length ratio (a long axis/a short axis) of a long axis to a short axis is 1.95 or more.

Each of the first external electrode 131 and the second external electrode 132 may further include a plating layer disposed outside the conductive resin layer.

The plating layer may include nickel (Ni), copper (Cu), tin (Sn), palladium (Pd), platinum (Pt), gold (Au), silver (Ag), tungsten (W), titanium (Ti), lead (Pb), or an alloy thereof. For example, the plating layer may be a nickel (Ni) plating layer or a tin (Sn) plating layer, may have a shape in which a nickel (Ni) plating layer and a tin (Sn) plating layer are sequentially stacked, and may have a shape in which a tin (Sn) plating layer, a nickel (Ni) plating layer, and a tin (Sn) plating layer are sequentially stacked. Additionally, the plating layer may include a plurality of nickel (Ni) plating layers and/or a plurality of tin (Sn) plating layers.

The plating layer may improve mountability with a substrate, structural reliability, durability against the outside, thermal resistance, or equivalent series resistance (ESR) of the multilayer ceramic capacitor 100.

Hereinafter, a method of manufacturing the multilayer ceramic capacitor 100 according to an embodiment will be described.

The multilayer ceramic capacitor 100 according to the embodiment may be manufactured through a step of preparing the conductive paste by mixing raw materials including nickel (Ni) and cerium oxide ($CeO_2$), a step of manufacturing the dielectric green sheet using a dielectric slurry and printing the conductive paste on a surface of the dielectric green sheet to form a conductive paste layer, a step of manufacturing a dielectric green sheet stacking body by stacking dielectric green sheets including the dielectric green sheet on which conductive paste layers including the conductive paste layer are formed, a step of manufacturing the capacitor body including the dielectric layer and the internal electrode layer by sintering the dielectric green sheet stacking body, and a step of forming the external electrode on one surface of the capacitor body.

Cerium oxide ($CeO_2$) may be mixed in an amount of 0.01 parts by weight to 5 parts by weight, 0.05 parts by weight to 3 parts by weight, or 0.08 parts by weight to 2.5 parts by weight based on 100 parts by weight of nickel (Ni). If cerium oxide ($CeO_2$) is mixed within the content range, the thermal stability of the internal electrode layer may be increased during the high-temperature firing so that the sintering mismatch between the dielectric layer and the internal electrode layer is reduced, and cerium (Ce) may diffuse into the dielectric layer during the firing so that the degradation due to the oxygen vacancy is improved.

The raw material including nickel (Ni) and cerium oxide ($CeO_2$) may further include a conductive metal such as copper (Cu), silver (Ag), palladium (Pd), gold (Au), an alloy thereof, or a combination thereof. The conductive metal may be mixed in an amount of 0.01 parts by weight to 5 parts by weight based on 100 parts by weight of nickel (Ni).

The conductive paste may be prepared by mixing the raw material, a conductive powder, a binder, and a solvent.

The dielectric slurry may be prepared by selectively mixing a barium titanate-based main ingredient powder and an accessory ingredient powder. The accessory ingredient powder may be used in the form of a sol dispersed in an organic solvent.

The accessory ingredient powder may use an oxide of the metal that is the accessory ingredient described above. For reference, cerium (Ce) included within the dielectric layer 111 according to the embodiment is not obtained from the dielectric slurry, but cerium (Ce) included within the dielectric layer 111 is an ingredient derived from cerium oxide ($CeO_2$) added during manufacturing of the internal electrode layers 121 and 122, and diffuses into the dielectric layer 111 by the firing.

Additionally, the dielectric slurry may be prepared by additionally mixing an additive (e.g., a dispersant, a binder, a plasticizer, a lubricant, an antistatic agent, or the like) and a solvent.

For example, the dispersant may include a phosphoric acid ester-based dispersant, a polycarboxylic acid-based dispersant, or a combination thereof. The dispersant may be mixed in an amount of 0.1 parts by weight to 5 parts by weight or 0.3 parts by weight to 3 parts by weight based on a total amount of 100 parts by weight of a barium titanate and gallium (Ga) complex compound. When the dispersant is mixed within the content range, dispersibility of the dielectric slurry is excellent, and an amount of an impurity included in the manufactured dielectric layer may be reduced.

For example, the binder may be an acryl resin, a polyvinylbutyl resin, a polyvinylacetal resin, an ethylcellulose resin, or the like. The binder may be added in an amount of 0.1 parts by weight to 50 parts by weight or 3 parts by weight to 30 parts by weight based on a total amount of 100 parts by weight of a barium titanate and gallium (Ga) complex compound. When the binder is mixed within the content range, dispersibility of the dielectric slurry is excellent, and an amount of an impurity included in the manufactured dielectric layer may be reduced.

For example, the plasticizer may be a phthalic acid-based compound such as phthalic acid dioctyl, phthalic acid benzyl butyl, phthalic acid dibutyl, phthalic acid dihexyl, phthalic acid di(2-ethylhexyl), phthalic acid di(2-ethylbutyl), or the like, an adipic acid-based compound such as adipic acid dihexyl, adipic acid di(2-ethylhexyl), or the like, a glycolic compound such as ethyleneglycol, diethyleneglycol, triethyleneglycol, or the like, a glycol ester-based compound such as triethylene glycol dibutyrate, triethylene glycol di(2-ethylbutylate), triethylene glycol di(2-ethylhexanoate), or the like. The plasticizer may be added in an amount of 0.1 parts by weight to 20 parts by weight or 1 parts by weight to parts by weight based on a total amount of 100 parts by weight of a barium titanate and gallium (Ga) complex compound. If the plasticizer is mixed within the content range, dispersibility of the dielectric slurry is excellent, and an amount of an impurity included in the manufactured dielectric layer may be reduced.

The solvent may be an aqueous solvent such as water or the like, an alcohol-based solvent such as ethanol, methanol, benzylalcohol, methoxyethanol, or the like, a glycolic solvent such as ethyleneglycol, diethyleneglycol, or the like, a ketone-based solvent such as acetone, methylethylketone, methylisobutylketone, cyclohexanone, or the like, an ester-based solvent such as butyl acetate, ethyl acetate, carbitol acetate, butylcarbitol acetate, or the like, an ether-based solvent such as methylcellosolve, ethylcellosolve, butylether, tetrahydrofuran, or the like, or an aromatic-based solvent such as benzene, toluene, xylene, or the like. For example, the solvent may use the alcohol-based solvent or the aromatic-based solvent considering solubility or dispersibility of various additives included in the dielectric slurry. The solvent may be mixed in an amount of 50 parts by weight to 1000 parts by weight or 100 parts by weight to 500 parts by weight based on a total amount of 100 parts by weight of a barium titanate and gallium (Ga) complex compound. If the solvent is mixed within the content range, ingredients of the dielectric slurry may be sufficiently mixed, and then the solvent may be easily removed.

Selective mixing of the barium titanate-based main ingredient and the accessory ingredient may be performed using a wet ball mill or an agitated mill. When a zirconia ball is used in the wet ball mill, wet mixing may be performed for 8 hours to 48 hours or 10 hours to 24 hours using a plurality of zirconia balls with a diameter of 0.1 mm to 10 mm.

The prepared dielectric slurry is formed into the dielectric layer after sintering.

A method for molding the manufactured dielectric slurry into a sheet shape may include a tape molding method such as a doctor blade method, a calendar roll method, or the like. For example, the method for molding the manufactured dielectric slurry may use an on-roll molding coater of a head discharge type, and the dielectric green sheet may be obtained by drying the molding body.

The conductive paste layer is formed by applying the manufactured conductive paste to a surface of the dielectric green sheet in a predetermined pattern using various printing or transfer methods such as screen printing and the like. The manufactured conductive paste layer is formed into the internal electrode layer after sintering.

Next, the dielectric green sheet where the internal electrode pattern is formed is stacked in a plurality of layers and then the stacked dielectric green sheets are pressed in a stacking direction so that the dielectric green sheet stacking body is manufactured. In this case, the dielectric green sheet and the internal electrode pattern may be stacked so that the dielectric green sheet is disposed on upper and lower surfaces of the dielectric green sheet stacking body in the stacking direction.

A step of cutting the manufactured dielectric green sheet stacking body to a predetermined dimension by dicing or the like may be selectively performed.

In addition, the dielectric green sheet stacking body may be solidified and dried to remove the plasticizer or the like if necessary, and after the dielectric green sheet stacking body is solidified and dried, barrel polishing may be performed on the solidified and dried stacking body using a horizontal centrifugal barrel machine or the like. In the barrel polishing, the dielectric green sheet stacking body may be put into a barrel container together with a media and a polishing liquid and rotation motion or vibration may be applied to the barrel container so that an unnecessary portion such as a burr or the like generated during the cutting is polished. Additionally, after the barrel polishing, the dielectric green sheet stacking body may be washed with a cleaning solution such as water or the like, and the washed stacking body may be dried.

Next, the capacitor body may be manufactured by removing the binder from the dielectric green sheet stacking body and sintering the dielectric green sheet stacking body in which the binder is removed.

The binder removal treatment condition may be appropriately adjusted depending on an ingredient of the dielectric layer or an ingredient of the internal electrode layer. For example, a temperature increase speed during the binder removal treatment may be 5° C./hour to 300° C./hour, a support temperature during the binder removal treatment may be 180° C. to 400° C., and a temperature maintenance time during the binder removal treatment may be 0.5 hours to 24 hours. An atmosphere during the binder removal treatment may be air or a reducing atmosphere.

Sintering of the dielectric green sheet stacking body may be performed at a temperature of 1000° C. to 1400° C. or 1100° C. to 1350° C. If the sintering is performed at a temperature within the range, the sintering mismatch between the dielectric layer and the internal electrode layer may be reduced so that the connectivity of the internal electrode is improved.

Additionally, the sintering may be performed for 0.5 hours to 8 hours or 1 hour to 3 hours. Additionally, the sintering may be performed in a reducing atmosphere (for example, an atmosphere including a humidified mixed gas of nitrogen and hydrogen). If the internal electrode includes nickel (Ni) or a nickel (Ni) alloy, an oxygen partial pressure in the sintering atmosphere may be $1.0 \times 10^{-14}$ MPa to $1.0 \times 10^{-10}$ MPa.

After the sintering, annealing may be performed if necessary. The annealing may be a treatment for re-oxidizing the dielectric layer, and the annealing may be performed if the sintering treatment is performed in the reducing atmosphere. A condition of the annealing treatment may be appropriately adjusted depending on an ingredient of the dielectric layer. For example, a temperature during the annealing may be 950° C. to 1150° C., a time during the annealing may be 0 hours to 20 hours, and a temperature increase speed during the annealing may be 50° C./hour to 500° C./hour. An atmosphere of the annealing may be a humidified nitrogen gas ($N_2$) atmosphere, and an oxygen partial pressure in the atmosphere of the annealing may be $1.0 \times 10^{-9}$ MPa to $1.0 \times 10^{-5}$ MPa.

In the binder removal treatment, the sintering treatment, or the annealing treatment, for example, a wetter or the like may be used to humidify the nitrogen gas, the mixed gas, or the like. In this case, a temperature of water may be 5° C. to 75° C. The binder removal treatment, the sintering treatment, or the annealing treatment may be sequentially performed or may be independently performed.

Selectively, a surface treatment such as a sandblasting treatment, laser irradiation, the barrel polishing, or the like may be performed on the third and fourth surfaces of the manufactured capacitor body 110. By performing the surface treatment, end portions of the first internal electrode layer and the second internal electrode layer may be exposed on outermost surfaces of the third and fourth surfaces. Thus, electrical bonding between the first and second external electrodes and the first and second internal electrodes may become good, and the alloy portion may be easily formed.

Next, the external electrode is formed on one surface of the manufactured capacitor body 110.

For example, a paste for forming the sintering metal layer may be applied to the external electrode, and then the applied external electrode may be sintered to form the sintering metal layer.

The paste for forming the sintering metal layer may include a conductive metal and a glass. Descriptions of the conductive metal and the glass are the same as described above so that repeated descriptions thereof are omitted. Additionally, the paste for forming the sintering metal layer may selectively include a binder, a solvent, a dispersant, a plasticizer, an oxide powder, or the like. For example, the binder may use ethylcellulose, acryl, butyral, or the like, and for example, the solvent may use an organic solvent (e.g., terpineol, butylcarbitol, alcohol, methyl ethyl ketone, acetone, toluene, or the like) or an aqueous solvent.

A method for applying the paste for forming the sintering metal layer to an outer surface of the capacitor body 110 may include various printing methods such as a dip method, screen printing, and the like, an application method using a dispenser or the like, a spraying method using a spray, or the like. The paste for forming the sintering metal layer may be applied to at least the third and fourth surfaces of the capacitor body 110, and may selectively be applied to a portion of the first, second, fifth, or sixth surfaces where the band portion of each of the first and second external electrodes is formed.

Thereafter, the capacitor body 110 on which the paste for forming the sintering metal layer is applied is dried, and the dried capacitor body is sintered at a temperature of 700° C. to 1000° C. for 0.1 to 3 hours to form the sintering metal layer.

Selectively, a paste for forming the conductive resin layer may be applied to the outer surface of the capacitor body 110, and then the applied capacitor body may be cured to form the conductive resin layer.

The paste for forming the conductive resin layer may include a resin, and may selectively include a conductive metal or a non-conductive filler. Descriptions of the conductive metal and the resin are the same as described above so that repeated descriptions thereof are omitted. Additionally, the paste for forming the conductive resin layer may selectively include a binder, a solvent, a dispersant, a plasticizer, an oxide powder, or the like. For example, the binder may be ethylcellulose, acryl, butyral, or the like, and for example, the solvent may be an organic solvent (e.g., terpineol, butylcarbitol, alcohol, methyl ethyl ketone, acetone, toluene, or the like) or an aqueous solvent.

As an example, the conductive resin layer may be formed by dipping the capacitor body 110 into the paste for forming the conductive resin layer and then curing the dipped capacitor body, the conductive resin layer may be formed by printing the paste for forming the conductive resin layer on a surface of the capacitor body 110 using a screen printing method, a gravure printing method, or the like, or the conductive resin layer may be formed by applying the paste for forming the conductive resin layer to the surface of the capacitor body 110 and then curing the applied capacitor body.

Next, the plating layer is formed at the outside of the conductive resin layer.

For example, the plating layer may be formed by a plating method, or may be formed by sputter or electric deposition.

Hereinafter, the above-described implementation example will be described in more detail through an embodiment below. However, the embodiment below is for illustrative purpose only and does not limit the scope of the present disclosure.

(Manufacturing of Multilayer Ceramic Capacitor)

Example 1

The conductive paste is prepared by mixing the raw material including nickel (Ni) and cerium oxide ($CeO_2$). In this case, $CeO_2$ is mixed in an amount of 0.1 parts by weight based on 100 parts by weight of Ni.

Next, the dielectric slurry is prepared by using a barium titanate ($BaTiO_3$) powder. In this case, the preparation of dielectric slurry is performed by using a zirconium ($ZrO_2$) ball as a dispersion medium, adding ethanol (or toluene), a dispersant, and a binder, and then performing mechanical milling.

Next, the dielectric green sheet is manufactured using the manufactured dielectric slurry through the on-roll molding coater of the head discharge type. The manufactured conductive paste is printed on a surface of the dielectric green sheet to form the conductive paste layer. The dielectric green sheet stacking body is manufactured by stacking and pressing the dielectric green sheet (a width×a length×a height=3.2 mm×2.5 mm×2.5 mm) on which the conductive paste layer is formed. A plasticization process is performed on the dielectric green sheet stacking body at 400° C. or less in a nitrogen atmosphere, and the dielectric green sheet stacking body is sintered under conditions of a sintering temperature of 1300° C. and a hydrogen ($H_2$) concentration of 1.0% or less.

Subsequently, the multilayer ceramic capacitor is manufactured through processes such as forming of the external electrode, the plating, and the like.

Example 2

The multilayer ceramic capacitor is manufactured in the same method as Example 1 except that the conductive paste is prepared by mixing $CeO_2$ in an amount of 0.2 parts by weight with respect to 100 parts by weight of Ni in Example 1.

Example 3

The multilayer ceramic capacitor is manufactured in the same method as Example 1 except that the conductive paste is prepared by mixing $CeO_2$ in an amount of 0.3 parts by weight based on 100 parts by weight of Ni in Example 1.

Example 4

The multilayer ceramic capacitor is manufactured in the same method as Example 1 except that the conductive paste is prepared by mixing $CeO_2$ in an amount of 0.4 parts by weight based on 100 parts by weight of Ni in Example 1.

Example 5

The multilayer ceramic capacitor is manufactured in the same method as Example 1 except that the conductive paste is prepared by mixing $CeO_2$ in an amount of 0.6 parts by weight based on 100 parts by weight of Ni in Example 1.

Example 6

The multilayer ceramic capacitor is manufactured in the same method as Example 1 except that the conductive paste is prepared by mixing $CeO_2$ in an amount of 1.0 parts by weight based on 100 parts by weight of Ni in Example 1.

Example 7

The multilayer ceramic capacitor is manufactured in the same method as Example 4 except that the dielectric green sheet stacking body is sintered at 1320° C. in Example 4.

Comparative Example 1

The multilayer ceramic capacitor is manufactured in the same method as Example 1 except that the conductive paste is prepared without using $CeO_2$ in Example 1.

Evaluation 1: SEM-EDS Analysis of Multilayer Ceramic Capacitor

Figure 6:
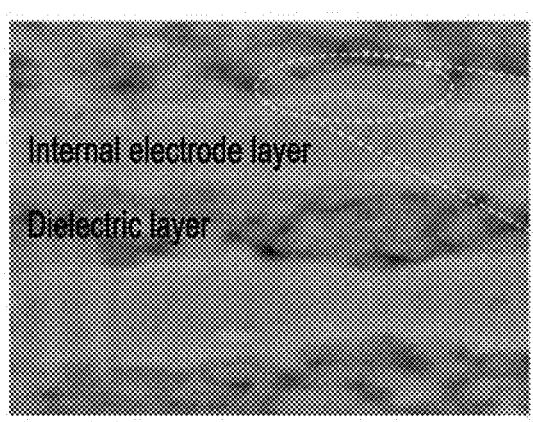
FIG. 6 is a SEM-EDS analysis image of the active region of the multilayer ceramic capacitor according to Example 1.
Figure 8A:
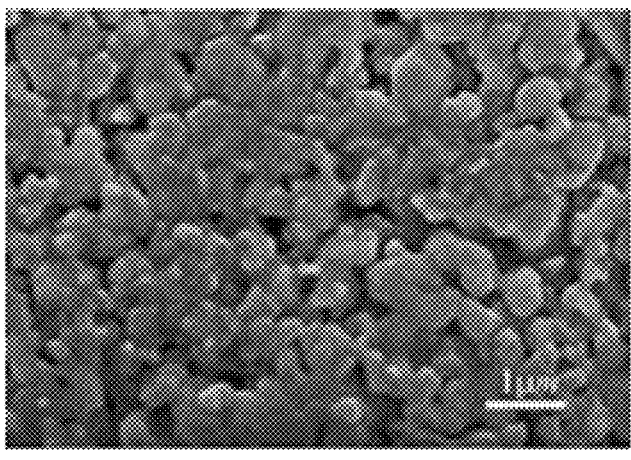
FIGS. 8A to 8E are scanning electron microscope (SEM) analysis images of interface regions of dielectric layers according to Examples 1, 2, 4, 5 and 7, respectively.
Figure 8B:
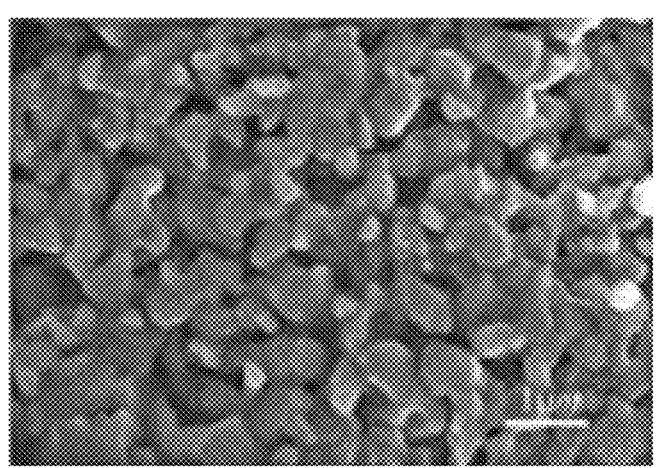
Figure 8C:
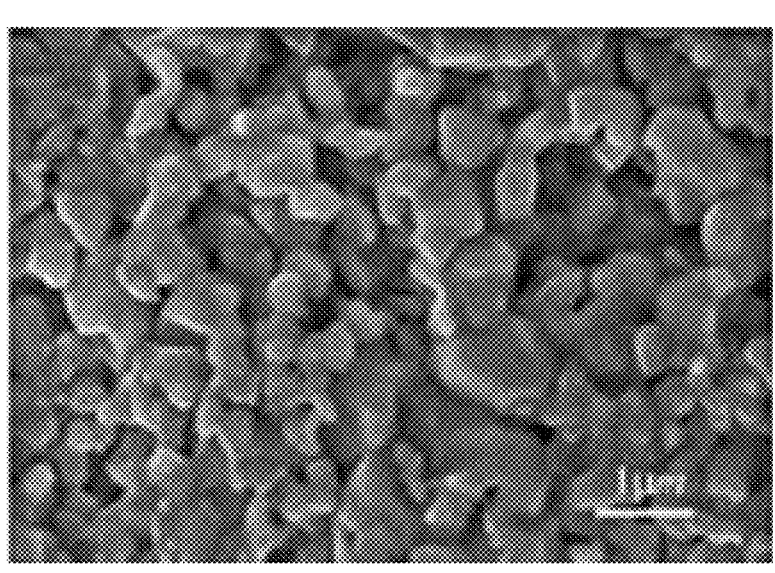
Figure 8D:
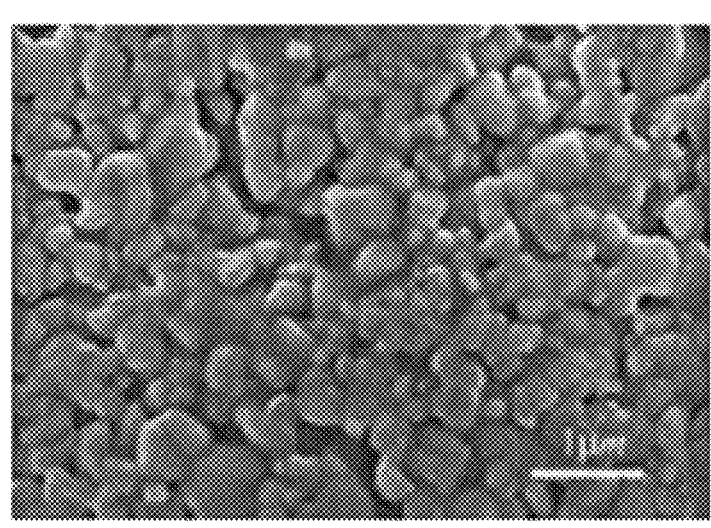
Figure 8E:
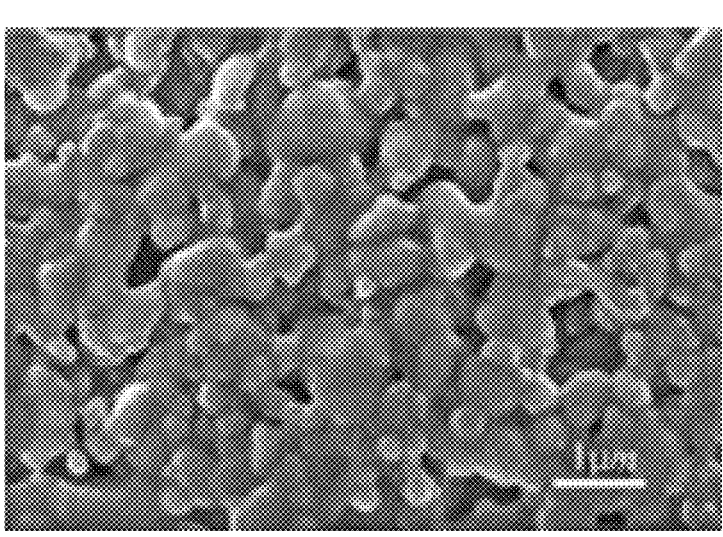

An analysis of the scanning electron microscope (SEM)-energy dispersion spectroscopy (EDS) is performed on the multilayer ceramic capacitor manufactured in Example 1, and the result thereof is shown in FIG. 6.

The analysis of the SEM-EDS is measured using the following method. A cross-section sample in which a surface in the W-axis and T-axis directions (a WT surface) of the capacitor body is polished to a ½ point in the L-axis direction after the multilayer ceramic capacitor manufactured in Example 1 is put into an epoxy mixed liquid (or an epoxy mixture) and the put multilayer ceramic capacitor is cured and the polished capacitor body is maintained within a vacuum atmosphere chamber so that the active region where the dielectric layer and each of the internal electrode layers cross each other is observed, is obtained. A central portion (a region C of FIG. 3) of the active region of the cross-section sample is measured using the SEM. The SEM is the Verios G4 product from Thermo fisher Scientific Inc., the measurement condition is 10 kV and 0.2 nA, an analysis magnification is 50 k times, and at least fifth layers of the dielectric layer and the internal electrode layers are measured. A content of cerium (Ce) may be confirmed through Point-EDS analysis in the SEM image of the measured cross-section sample. In the Point-EDS analysis, five points are designated at intervals of 500 nm in each of the central region A and the interface region B of each of the internal electrode layers and the interface region B' of the dielectric layer, and a content of cerium (Ce) at each point is measured. The Point-EDS analysis obtains an arithmetic average value of the measured values.

FIG. 6 is a SEM-EDS analysis image of the active region of the multilayer ceramic capacitor according to Example 1.

Referring to FIG. 6, in the case of Example 1, it may be confirmed that cerium (Ce) exists in the internal electrode layer. Specifically, it may be confirmed that cerium (Ce) exists in both the central region and the interface region of the internal electrode layer and is included in a higher content in the interface region than in the central region. Additionally, it may be confirmed that cerium (Ce) exists in the dielectric layer, and specifically, it may be confirmed that cerium (Ce) exists in the interface region of the dielectric layer. Here, when each of the internal electrode layers are divided into three portions in the thickness direction to be divided into upper, middle, and lower portions, the middle portion is referred to as the central region, and at least one of the upper and lower portions having an interface between the dielectric layer and each of the internal electrode layers is referred to as the interface region. In addition, when the dielectric layer is divided into three portions in the thickness direction to be divided into upper, middle, and lower portions, the middle portion is referred to as the central region, and at least one of the upper and lower portions having an interface between the dielectric layer and each of the internal electrode layers is referred to as the interface region.

Evaluation 2: Thermomechanical Analysis (TMA) of Internal Electrode Layer Material In order to confirm thermal stability of the internal electrode layer of the multilayer ceramic capacitor manu-factured in each of Example 6 and Comparative Example 1, a thermomechanical analysis (TMA) is measured for the internal electrode layer material, and the result thereof is shown in FIG. 7 and Table 1 below.

The TMA is measured using the following method. A heat shrinkage behavior when a pellet-shaped sample made by pressing a mixed powder of the material for forming the internal electrode layer according to each of Example 6 and Comparative Example 1 is heated using a TMA device (TMA 450 EM/RH from I-tube Inc.), is measured. The measurement condition is $H_2$ gas of 3% and a temperature increase speed of 10 K/min.

Figure 7:
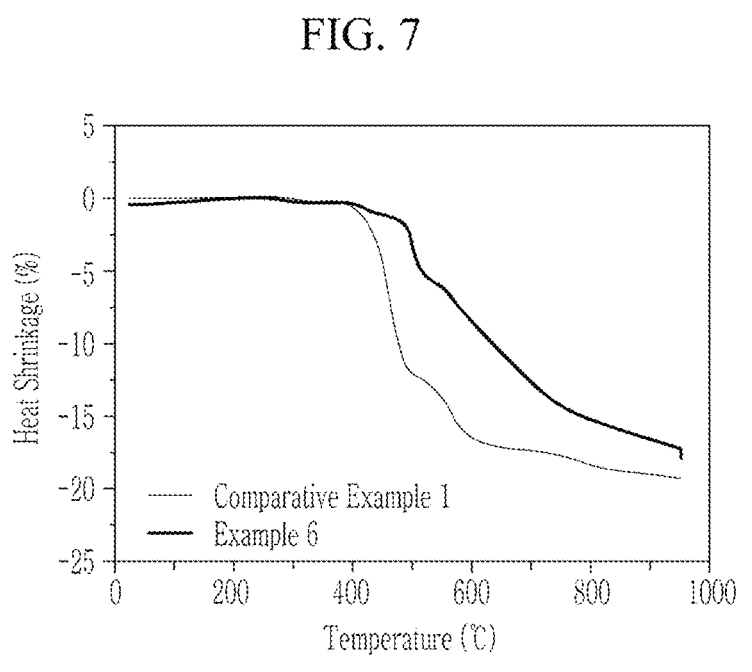

FIG. 7 is a thermomechanical analysis (TMA) graph of the internal electrode layer material according to Example 6 and Comparative Example 1.

TABLE 1

| | Temperature at initial shrinkage | Temperature at 5% shrinkage | Final shrinkage rate |
| --- | --- | --- | --- |
| Comparative Example 1 | 358° C. | 452° C. | −19.2% |
| Example 6 | 410° C. | 515° C. | −17.2% |

It may be seen that comparing the temperatures at a time when the internal electrode layer material is shrunk by 5% in FIG. 7 and Table 1, the temperature of Comparative Example 1 using only Ni is 452° C. but the temperature of Example 6 including Ni and Ce is 515° C. so that a delay in shrinkage of about 63° C. occurs. Accordingly, it may be seen that the internal electrode layer including Ni and Ce according to the embodiment has a heat shrinkage delay effect.

Evaluation 3: SEM Analysis of Dielectric Layer

An analysis of the scanning electron microscope (SEM) is performed on the dielectric layer of the multilayer ceramic capacitor manufactured in each of Examples 1, 2, 4, 5, and 7, and the results thereof are shown in FIGS. 8A to 8E.

The analysis of the SEM is measured using the following method. A cross-section sample in which a surface in the W-axis and T-axis directions (a WT surface) of the capacitor body is polished to a ½ point in the L-axis direction after the multilayer ceramic capacitor manufactured in each of Examples 1, 2, 4, 5, and 7 is put into an epoxy mixed liquid (or an epoxy mixture) and the put multilayer ceramic capacitor is cured and the polished capacitor body is main-tained within a vacuum atmosphere chamber so that the active region where the dielectric layer and each of the internal electrode layers cross each other is observed, is obtained. The analysis of the SEM is performed on the interface region of the dielectric layer in a central portion of the active region of the cross-section sample. In this case, when the dielectric layer is divided into three portions in the thickness direction to be divided into upper, middle, and lower portions, at least one of the upper and lower portions having an interface between the dielectric layer and each of the internal electrode layers corresponds to the interface region. The SEM is the Verios G4 product from Thermo fisher Scientific Inc., the measurement condition is 10 kV and 0.2 nA, and an analysis magnification is 50 k times.

FIGS. 8A to 8E are scanning electron microscope (SEM) analysis images of interface regions of dielectric layers according to Examples 1, 2, 4, 5 and 7, respectively.

Referring to FIGS. 8A to 8E, in the case of Examples 1, 2, 4, 5, and 7, it may be seen that cerium (Ce) diffuses into the dielectric layer during the firing because cerium (Ce) is added to the internal electrode layer so that a size of the dielectric grain present in the interface region of the dielectric layer in contact with the internal electrode layer (4) Break down voltage (BDV)

A maximum voltage (V) when the sample chip connected to a circuit is destroyed by increasing a voltage step by step at a voltage boosting speed of 20 V/s is measured.

(5) Mean Time to Failure (MTTF)

An average failure time (hr) of each of sample chips is obtained by measuring under conditions of a temperature of 125° C., a voltage of 9.45V, and a time of 48 hours.

TABLE 2

|  | Internal electrode connectivity | Dielectric constant | Capacitance | BDV | MTTF |
| --- | --- | --- | --- | --- | --- |
| Comparative Example 1 | 1 (reference) (or reference value)) | 1 (reference) | 1 (reference) | 1 (reference) | 1 (reference) |
| Example 1 | 1.05 | 1.02 | 1.02 | 1.03 | 1.04 |
| Example 2 | 1.08 | 1.05 | 1.06 | 1.09 | 1.15 |
| Example 3 | 1.13 | 1.07 | 1.09 | 1.14 | 1.22 |
| Example 4 | 1.15 | 1.11 | 1.05 | 1.16 | 1.3 |
| Example 5 | 1.17 | 1.08 | 1.02 | 1.1 | 1.12 | increases. Additionally, it may be seen that this may improve the dielectric constant and the reliability.

Evaluation 4: Reliability of Multilayer Ceramic Capacitor

Reliability of the following items for the multilayer ceramic capacitor manufactured according to each of Examples 1 to 5 and Comparative Example 1 is measured, and the results thereof are shown in Table 2 below and FIG. 9. Each value shown in the following Table 2 corresponds to each ratio based on the result value of Comparative Example 1.

(1) Connectivity of Internal Electrode

After a cross-section sample using the same method as that in Evaluation 3 is obtained, the central portion of the active region of the cross-section sample is measured using the SEM. The SEM is the Verios G4 product from Thermo fisher Scientific Inc., the measurement condition is 10 kV and 0.2 nA, an analysis magnification is 10 k times, and about 30 internal electrode layers per photo are measured. After a total of three photographic images are obtained, an average value of the connectivity of the internal electrode is calculated. Each internal electrode connectivity is calculated by Equation 1 below.

$$\text{Internal electrode connectivity (\%)} = (\text{Total length of connecting portions excluding broken portions in plurality of internal electrode layers/Total length of plurality of internal electrode layers}) \times 100 \quad \text{[Equation 1]}$$

(2) Dielectric Constant of Dielectric

Capacitance of the sample chip, a dielectric thickness of the sample chip, and an effective area of the internal electrode layer of the sample chip are measured, and the dielectric constant of the dielectric is calculated from the measured values.

Figure 9:
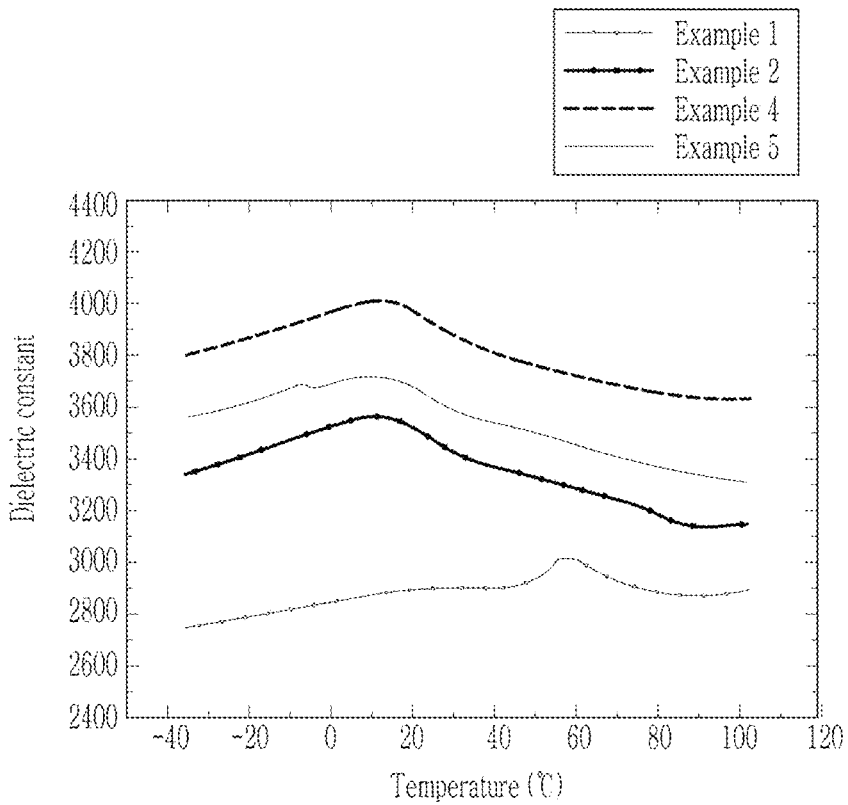
FIG. 9 is a graph showing dielectric constants of dielectrics according to Examples 1, 2, 4, and 5.

FIG. 9 is a graph showing dielectric constants of dielectrics according to Examples 1, 2, 4, and 5. Referring to FIG. 9, it may be seen that the dielectric constant of the dielectric is improved in each of Examples 1, 2, 4, and 5.

(3) Capacitance

The capacitance (F) is measured under conditions of a frequency of 1 kHz and a voltage of 0.5 V.

Referring to Table 2, it may be seen that Examples 1 to 5 in which cerium (Ce) is included in a higher content in the interface region than in the central region within the internal electrode layer have excellent internal electrode connectivity, dielectric constant, capacitance, and breakdown voltage (BDV) compared with Comparative Example 1 not including cerium (Ce) to improve the reliability.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayer ceramic capacitor, comprising:
   a capacitor body that includes a dielectric layer and an internal electrode layer; and
   an external electrode that is disposed outside the capacitor body,
   wherein the internal electrode layer includes nickel (Ni) and cerium (Ce), and along a thickness direction of the internal electrode layer, the internal electrode layer comprises an upper portion, a middle portion, and a lower portion, the middle portion is referred to as a central region, and at least one of the upper portion and the lower portion having an interface between the internal electrode layer and the dielectric layer is referred to as an interface region, both the central region and the interface region of the internal electrode layer include the cerium (Ce), and the interface region includes the cerium (Ce) in a content higher than a content of cerium (Ce) in the central region.

2. The multilayer ceramic capacitor of claim 1, wherein the interface region of the internal electrode layer includes the cerium (Ce) in a content that is 1.5 to 3 times higher than the content of cerium (Ce) in the central region of the internal electrode layer.

3. The multilayer ceramic capacitor of claim 1, wherein the internal electrode layer includes the cerium (Ce) in an amount of 0.01 parts by weight to parts by weight based on 100 parts by weight of the nickel (Ni).

4. The multilayer ceramic capacitor of claim 1, wherein the internal electrode layer further includes copper (Cu), silver (Ag), palladium (Pd), gold (Au), an alloy thereof, or a combination thereof.

5. The multilayer ceramic capacitor of claim 1, wherein the dielectric layer includes (i) a barium titanate-based main ingredient including barium (Ba) and titanium (Ti), and (ii) cerium (Ce).

6. The multilayer ceramic capacitor of claim 5, wherein along a thickness direction of the dielectric layer, the dielectric layer comprises an upper portion, a middle portion, and a lower portion, the middle portion is referred to as a central region, and at least one of the upper portion and the lower portion having an interface between the dielectric layer and the internal electrode layer is referred to as an interface region, the interface region of the dielectric layer includes the cerium (Ce).

7. The multilayer ceramic capacitor of claim 6, wherein the interface region of the dielectric layer includes the cerium (Ce) in an amount of 0.05 parts by mole to 1 parts by mole based on 100 parts by mole of the barium (Ba) within the interface region of the dielectric layer.

8. The multilayer ceramic capacitor of claim 7, wherein the interface region of the dielectric layer comprises a region from the interface between the dielectric layer and the internal electrode layer to a depth of 10 nm to 100 nm, and the region includes the cerium (Ce) in an amount of 0.05 parts by mole to 1 parts by mole based on 100 parts by mole of the barium (Ba).

9. The multilayer ceramic capacitor of claim 6, wherein the interface region of the dielectric layer includes a plurality of dielectric grains, at least one of the plurality of dielectric grains has a structure including a core and a shell surrounding at least a portion of the core, and the shell includes the cerium (Ce).

10. The multilayer ceramic capacitor of claim 9, wherein a size D50 of the plurality of dielectric grains is 50 nm to 250 nm.

11. The multilayer ceramic capacitor of claim 5, wherein the cerium (Ce) included in the dielectric layer is derived from cerium oxide ($CeO_2$) used in forming the internal electrode layer and is an ingredient diffusing into the dielectric layer after sintering.

12. A method of manufacturing a multilayer ceramic capacitor, comprising:

preparing a conductive paste by mixing a raw material including nickel (Ni) and cerium oxide ($CeO_2$);

manufacturing a dielectric green sheet using a dielectric slurry and printing the conductive paste on a surface of the dielectric green sheet to form a conductive paste layer;

manufacturing a dielectric green sheet stacking body by stacking the dielectric green sheet on which the conductive paste layer is formed;

manufacturing a capacitor body including a dielectric layer and an internal electrode layer by sintering the dielectric green sheet stacking body; and forming an external electrode on one surface of the capacitor body, wherein the internal electrode layer includes nickel (Ni) and cerium (Ce), and along a thickness direction of the internal electrode layer, the internal electrode layer comprises an upper portion, a middle portion, and a lower portion, the middle portion is referred to as a central region, and at least one of the upper portion and the lower portion having an interface between the internal electrode layer and the dielectric layer is referred to as an interface region, both the central region and the interface region of the internal electrode layer include the cerium (Ce), and the first interface region includes the cerium (Ce) in a content higher than a content of cerium (Ce) in the first central region.

13. The method of claim 12, wherein the cerium oxide ($CeO_2$) is mixed in an amount of 0.01 parts by weight to 5 parts by weight based on 100 parts by weight of the nickel (Ni).

14. The method of claim 12, wherein the raw material further includes copper (Cu), silver (Ag), palladium (Pd), gold (Au), an alloy thereof, or a combination thereof.

15. The method of claim 12, wherein the dielectric slurry is prepared by mixing a barium titanate-based main ingredient powder and an accessory ingredient powder.

16. The method of claim 12, wherein the sintering is performed at a temperature of 1000° C. to 1400° C.

17. The method of claim 16, wherein the sintering is performed in a reducing atmosphere.

18. The method of claim 16, wherein the sintering is performed in an atmosphere having an oxygen partial pressure of $1.0 \times 10^{-14}$ MPa to $1.0 \times 10^{-10}$ MPa.

19. The method of claim 12, wherein the dielectric layer includes cerium (Ce) that is obtained from cerium oxide ($CeO_2$) used in forming the internal electrode layer and that diffused into the dielectric layer after the sintering.

20. The method of claim 15, wherein the accessory ingredient powder including manganese (Mn), chromium (Cr), silicon (Si), aluminum (Al), magnesium (Mg), tin (Sn), antimony (Sb), germanium (Ge), gallium (Ga), indium (In), barium (Ba), lanthanum (La), yttrium (Y), actinium (Ac), praseodymium (Pr), neodium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or a combination thereof.

* * * * *